United States Patent [19]
Wellings

[11] Patent Number: 5,266,245
[45] Date of Patent: Nov. 30, 1993

[54] METHODS FOR APPLYING ACOUSTIC COVERINGS TO SURFACES OF A MARINE VESSEL

[75] Inventor: Kenneth J. Wellings, Barrow-in-Furness, United Kingdom

[73] Assignee: Vickers Shipbuilding & Engineering Ltd., Cambria, England

[21] Appl. No.: 20,230

[22] Filed: Feb. 19, 1993

Related U.S. Application Data

[63] Continuation of Ser. No. 683,453, Apr. 10, 1991, abandoned.

[30] Foreign Application Priority Data

Apr. 10, 1990 [GB] United Kingdom ............... 9008088

[51] Int. Cl.⁵ .............................................. B29C 39/12
[52] U.S. Cl. ..................................... 264/35; 114/355; 114/357; 181/286; 264/225; 264/250; 264/261; 264/263; 367/1
[58] Field of Search ................. 264/250, 261, 263, 31, 264/35, DIG. 31, 225; 181/198, 286, 287; 367/1; 114/11, 12, 13, 355, 357

[56] References Cited

U.S. PATENT DOCUMENTS

| | | | |
|---|---|---|---|
| 946,731 | 1/1910 | Pedrick | 264/DIG. 31 |
| 3,130,700 | 4/1964 | Peterson | 367/1 |
| 3,755,031 | 8/1973 | Hoffman et al. | 264/250 |
| 3,757,888 | 9/1973 | Lagier et al. | 181/198 |
| 3,894,169 | 7/1975 | Miller | 367/1 |
| 4,112,164 | 9/1978 | Koss | 181/286 |
| 4,626,391 | 12/1986 | Taylor | 264/263 |
| 4,628,490 | 12/1986 | Kramer et al. | 367/1 |
| 4,669,573 | 6/1987 | Goodman | 181/286 |
| 4,821,243 | 4/1989 | Caprette, Jr. | 181/198 |
| 4,883,143 | 11/1989 | Lagier | 181/286 |
| 4,949,317 | 8/1990 | McQuitty et al. | 181/286 |
| 5,036,788 | 8/1991 | Unger | 114/355 |

Primary Examiner—Jan H. Silbaugh
Assistant Examiner—Brian J. Eastley
Attorney, Agent, or Firm—Helfgott & Karas

[57] ABSTRACT

Methods for applying coverings to surfaces by casting at least a portion of the covering in a mould from a solidifiable liquid mix. The mould may be applied directly to the surface or to an already cast layer of the covering. In another embodiment an outer portion of the covering is cast in a mould and is affixed to the surface, or to an already cast layer of the covering, so as to define a void between the outer portion and the surface or already cast layer. The void is filled with solidifiable liquid mix.

9 Claims, 6 Drawing Sheets

METHODS FOR APPLYING ACOUSTIC COVERINGS TO SURFACES OF A MARINE VESSEL

This is a continuation of application Ser. No. 683,453, filed Apr. 10, 1991.

The present invention relates to the application of coverings to surfaces. It relates particularly, but not exclusively, to the application of thick coverings such as acoustic 'tiling', to outer surfaces of submarines, or other classes of warship.

It is known that the external surfaces of submarines, i.e. pressure hull, casing, bridge fin and control surfaces, etc., can be covered with acoustic 'tiling'. Originally the covering was in the form of 'tiles' which were affixed with impact adhesive. It is also known that tiles can be increased in area and applied mechanically in strip form. Though applied in strips, the term 'tiling' is commonly used to refer to this acoustic covering.

As noise reduction technology has advanced, the thickness of tiling has been increased to give improved levels of attenuation. However, thick tiles or strips are more awkward to handle because they are heavier, and more difficult to bend. Also, when bent, a stronger adhesive bond is required to maintain the tile/strip in contact with the hull.

Differential thermal expansion/contraction between hull and tile and pressure cycling, further add to the duty imposed on the adhesive.

In a known method of applying such a covering, a mould is applied to the outer surface of the hull and sealed around its edges. The inner profile of the mould corresponds to the final outer profile required for the covering. The mould is filled with a solidifiable liquid mix and, when the liquid has set, the mould is removed leaving the covering on the surface. This method is, however, particularly disadvantageous in that the covering must be applied directly to the hull of the submarine (or other vessel) at the vessel building site. This is inconvenient and leads to difficulties in providing the necessary carefully controlled conditions for the application of the covering.

There is thus a need for an improved method of making the thick heavy tiling used to cover submarine hulls and/or of subsequently securing it to the hulls. It is further preferable that as much of the work as possible is done away from the vessel building site, i.e. under controlled workshop conditions.

In the method of the present invention, at least some of the tiling operation is carried out away from the surface to be covered. Thus, according to a first aspect of the invention, there is provided a method of applying a covering to a surface comprising steps of:

casting an outer part of the covering in a mould;
locating said outer part of the covering in the proper relation to the surface to give the required thickness of final covering and correct outer profile of said final covering thus creating a void between said outer part of the covering and said surface to be covered;
sealing said outer part of the covering to said surface to be covered on at least both sides and base; and;
filling said void with a solidifiable liquid mix.

In one embodiment of the invention, the surface comprises the hull of a marine vessel. In another embodiment of the invention, the surface comprises an already cast inner layer of the covering.

Conveniently, the step of locating the outer part of the covering in proper relation to the surface to be covered is done using spacers, either made separately and fixed in position, or cast as a part of the outer covering and thus fixed in position. The step of sealing the outer covering to the surface to be covered may be performed by casting edge pieces on to the outer part of the covering and sealing them to the surface to be covered with, for example, mastic. Alternatively suitably shaped sheet material, metal, plastic, tube or other may be temporarily attached to the outer part of the covering to seal the void. The solidifiable liquid mix is preferably a material which will bond firmly to both the outer covering and to the surface to be covered, thereby acting as the 'adhesive' to cause the outer covering and solidifiable mix to become a single, contiguous covering on the surface to be covered.

Preferably the outer part of the covering is cast separately in a dismantleable mould which may also be provided with means to cast spacers, edge pieces, etc. in situ as integral members of the outer part of the covering.

As an apparatus suitable for use in the above method, according to a second aspect of the invention there is provided an apparatus for applying a covering to a surface wherein the apparatus comprises a dismantleable mould, means to fill the said mould with a solidifiable liquid to form, when set, a portion of the said covering, means for locating the said portion in a predetermined relation to the said surface thereby to form a void between the said portion of the covering and the said surface, means to create a liquid-tight seal between the said surface and the portion of the covering and means to fill the void with a solidifiable liquid, thereby to form the covering.

In this aspect, it is preferable, but not essential, that said portion of the covering is the outermost part of the whole covering.

Thus, the portion of the covering may be cast separately under precisely controlled conditions, and be subsequently attached to the surface where it, in effect, forms a further mould and remains in situ as a part of the complete covering.

Normally, the solidifiable liquid used to fill the void will be chosen as one which bonds readily to the surface to be covered, at least when the surface to be covered is dry, clean and free from dust and/or grease. Preferably, however, the surface also has a 'key' to which the liquid bonds as it solidifies. Preferably also, the inner profile of the mould is treated, or made of a substance to which the solidifiable liquid will not bond, so that the mould may be easily removed when the liquid has solidified.

As the means for locating the mould in its predetermined relation to the surface to be covered, spacers may be used which may be incorporated into the completed covering or which alternatively may be removed along with the mould once the liquid has solidified.

A smooth overall surface can be obtained by filling in the gaps between adjacent portions of the covering and any other imperfections with a suitable mastic.

For a clearer understanding of the invention and to show how the same may be put into effect, reference will now be made by way of example only to the accompanying drawings in which.

In this description, the same reference numeral is used for the same component in different Figures. The description will take as an example the case of applying acoustic tiling to outer surfaces of a submarine, but it will be understood that the present invention is in no way limited to this use.

It has been found that a material suitable for use as acoustic tiling may be prepared as a liquid mix and subsequently cast into a mould. The liquid mix also has excellent properties of adhesion to most surfaces, e.g. cleaned, roughened metal, as well as to itself after previous curing, etc. Thus it is possible to 'cast' tiling directly in situ onto a submarine hull section.

Figure 1:
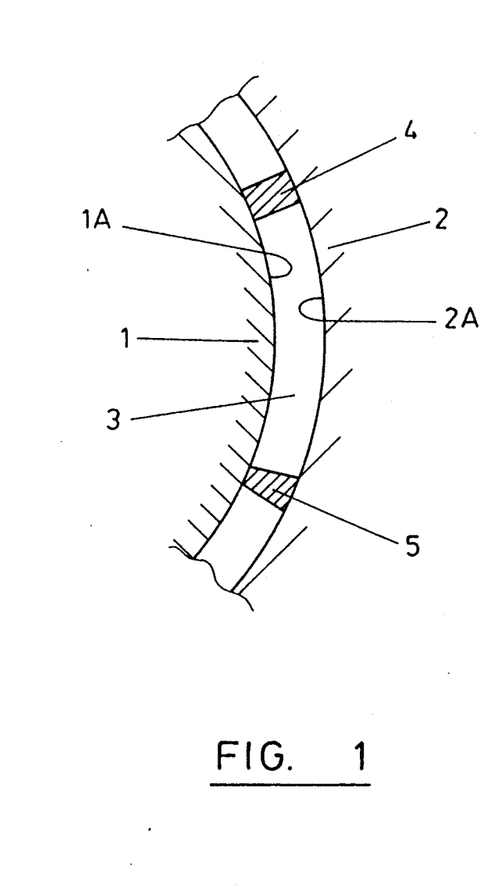
FIG. 1 is a section through part of a surface to be covered, with a mould applied to it prior to filling with liquid acoustic tiling mix (prior art)

FIG. 1 is an example of how a covering may be cast in place using the known prior art. It shows, in sectional view, part of a submarine 1 (e.g. part of the pressure hull or a control surface, etc.) with a mould 2 applied to it such that a predetermined annular space 3 exists between them. The annular space 3 will usually be of uniform thickness, as shown in FIG. 1, but this need not always be the case. The surface 1A of submarine is normally shotblasted, to clean and roughen it, degreased and, if necessary, primed before mould 2 is placed in position. The purpose of these operations is to provide a good 'key' to surface 1A to which the tiling mix can bond. Priming may be an anti-corrosion treatment or to enhance bonding, or both.

Surface 2A of mould 2 is of a nature such that the tiling mix does not adhere to it. Typical materials may include polymer sheets, e.g. polythene, or polished metal, e.g. aluminum sheet or foil. Mould 2 may be a continuous structure, i.e. have a smooth surface of, for example, plywood or sheet metal, to which a thin membrane 2A is attached.

Alternatively, it may be in the form of a grillage over which a sheet metal membrane 2A is formed. Mould 2 could be a free-standing structure aligned to give the required clearance 3, but a more practical way is to use spacers 4,5. Various types of spacer are possible. One type 4 is a pre-cast block of tiling 4A, 4B (FIGS. 2 & 3), of the correct thickness, which becomes an integral part of the final covering. Another type 5 is of a material to which the liquid tiling mix does not bond and which is removed once the mix has solidified and mould 2 has been taken away.

Figure 10:
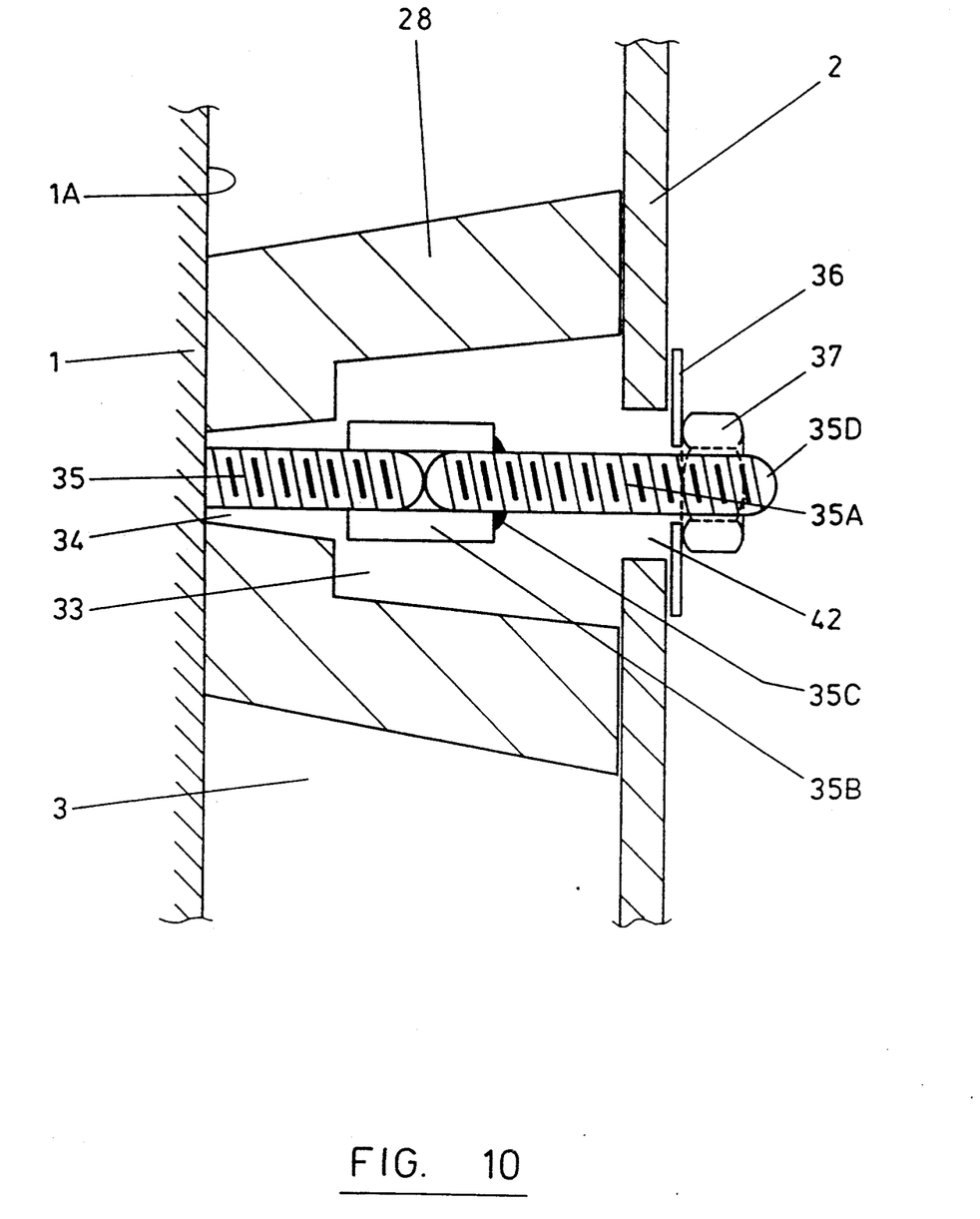
FIG. 10 shows, in sectional elevation, a detailed view of an alternative method of attaching a mould to the surface.

Another method of securing mould 2 at a predetermined position from submarine 1 is shown in FIG. 10. A conical spacer 28 is cast separately from the same tiling mix with a frusto-conical clearance hole 34 and a frusto-conical cylindrical void 33. When assembling mould 2 onto submarine 1, an extended length of stud iron 35, 35A is passed through a hole 42 in mould 2, through clearance hole 34 in spacer 28 and "shot" onto surface 1A. The two lengths of stud iron 35 and 35A are joined by collar 35B and are thus in intimate contact, so that no welding occurs, as the current passes freely; consequently welding occurs only between stud iron 35 and surface 1A. A load spreading washer 36 and nut 37 may be added to secure mould 2 tightly against spacer 28 and submarine 1.

When the liquid tiling mix has been run in to annular space 3 and has solidified, mould 2 is removed. Stud iron 35A and collar 35B (which may be welded together as indicated at 35C) are removed either via a screw driver slot 35D or via a box spanner if the surface of collar 35B is adapted to accept one. Voids 33 and 34 may be filled with tiling mix as described later.

Figure 2:
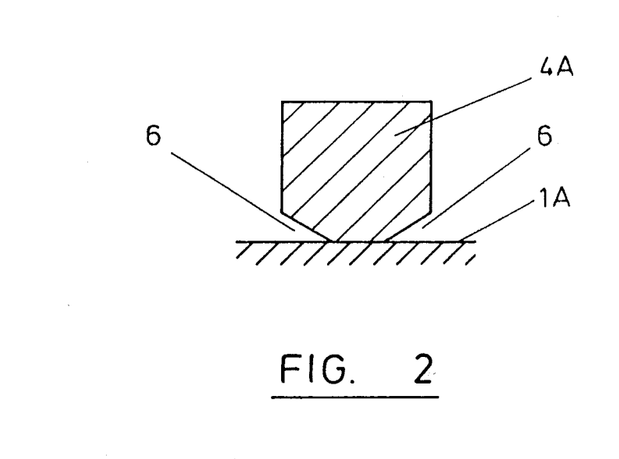
FIGS. 2 and 3 are sectional elevations of alternative forms of spacer (prior art)
Figure 3:
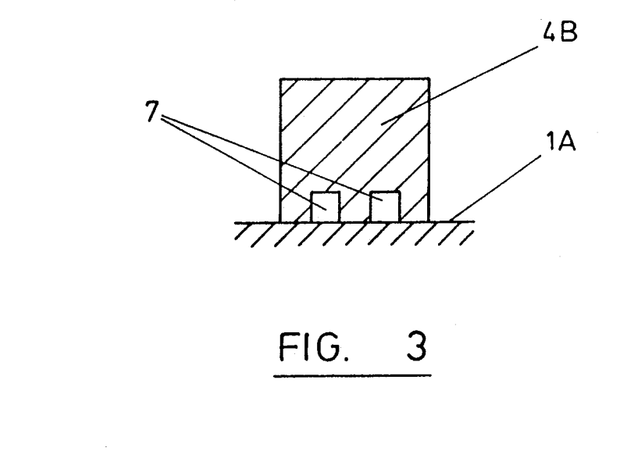

It is desirable to get as complete bonding of the tiling to surface 1A as is possible, as any air bubbles which become trapped will change in volume as the submarine dives and re-surfaces due to changing depth pressure (pressure cycling). Thus any spacers of type 4 should have as small an area of contact with surface 1A as practicable. FIGS. 2 and 3 show two possible spacers 4A and 4B respectively in which the faces abutting surface 1A are either undercut 6 or channelled 7 respectively.

When the mould 2 is fully prepared and all edges sealed (not shown), the liquid tiling mix is run in. This can be done by pouring in from the top or pumping in from the bottom as preferred. The mixture, which is very 'searching' (free-flowing) tends to move into all voids by the process of capillary action. Thus it tends to fill any cracks between surface 1A and spacers 4A, 4B; clearly the presence of undercuts 6 and channels 7 will increase the area between spacers 4A, 4B and surface 1A respectively where capillary action occurs. When the mixture has solidified into tiling, firmly bonded to surface 1A, mould 2 and any spacers 5 are removed. The hole left by spacers 5 can be filled by trowelling in a viscous mix, e.g. partly set tiling mixture, and smoothing it off flush with the adjacent surface.

Figure 4:
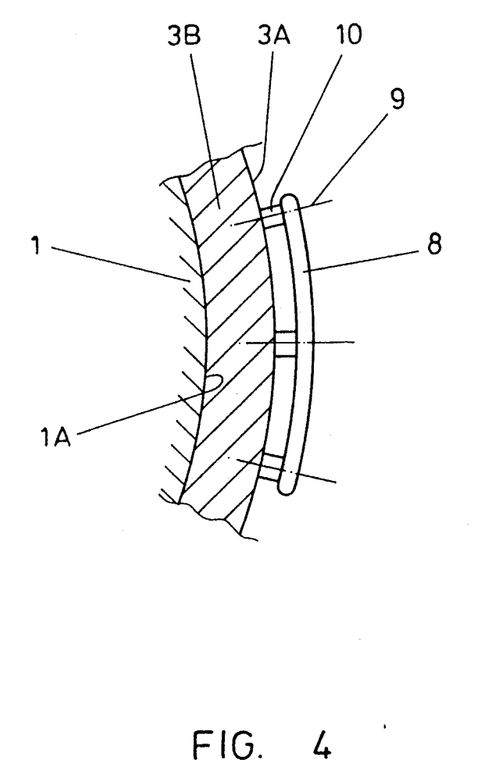
FIGS. 4 and 5 are sectional elevations of a partly tiled surface fitted with an acoustic element, before and after application of a mould (prior art) or outer part of the covering.
Figure 5:
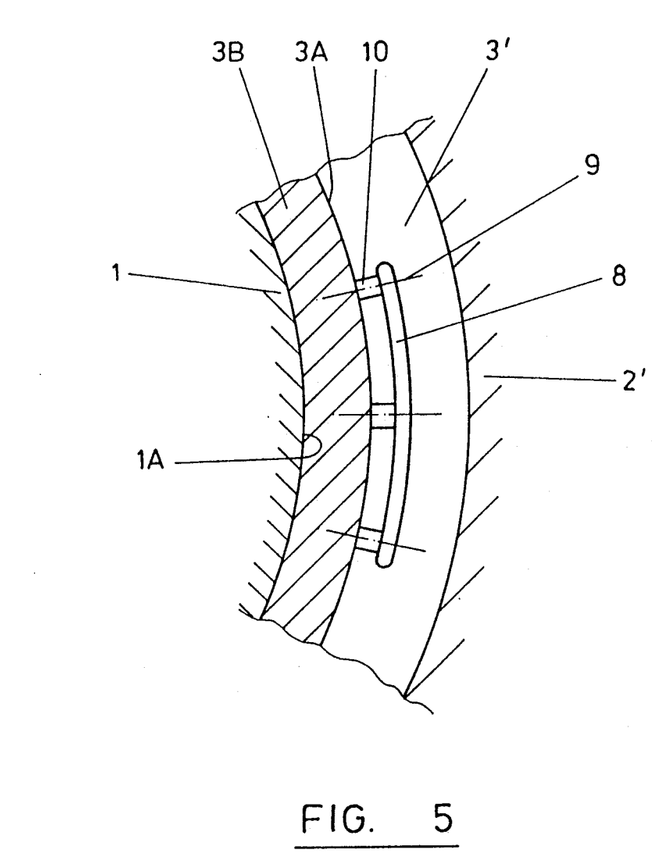

The covering method described above is most appropriate to use on, for example control surfaces, i.e. where a single homogeneous tiling mix is required and the covering can be applied in a workshop, prior to fitting to the vessel. On other areas of the hull, multiple layers of tiling may be required, sometimes in a 'sandwich form'. On yet other areas, separate elements may need to be incorporated into the tiling substrate. In order to accommodate these requirements, the above method may be modified, as follows.

Where a second (or further) layer is merely to be applied on top of the previously cast layer, the method shown in FIG. 1 is repeated using a larger mould 2' (FIG. 5), i.e. having the required curvature but further away from surface 1A so that a second annular space 3' is created between the surface of the first cast tiling layer 3A and the surface of larger mould 2'. The surface 3A of the first cast tiling layer may be suitable for the second layer to bond directly to it, otherwise a chemical and/or mechanical treatment may be needed to improve bonding.

Where separate elements 8 (FIG. 4) are to be incorporated into the tiling substrate, they may be attached to tiling 3B via means such as conventional wood screws - indicated by centrelines 9. Spacing washers 10 would preferably be used to give clearance between element 8 and surface 3A to allow easy access of the liquid tiling mix and thus eliminate air pockets. The larger mould 2' (FIG. 5) may then be fitted, sealed and the liquid tiling mix added as described before. In FIG. 5, spacers 4,5 have been omitted to avoid confusing detail.

The method and variation just described have certain disadvantages, e.g.

(i) they have to be performed on the submarine during building, i.e. on the slipway or in the construction hall (ii) supporting the massive moulds 2 requires much structure which impedes other operations.

It is thus far better if as much of the tiling operation as possible can be done away from the actual building vessel, i.e. in workshops, where conditions may be more easily controlled.

Figure 6:
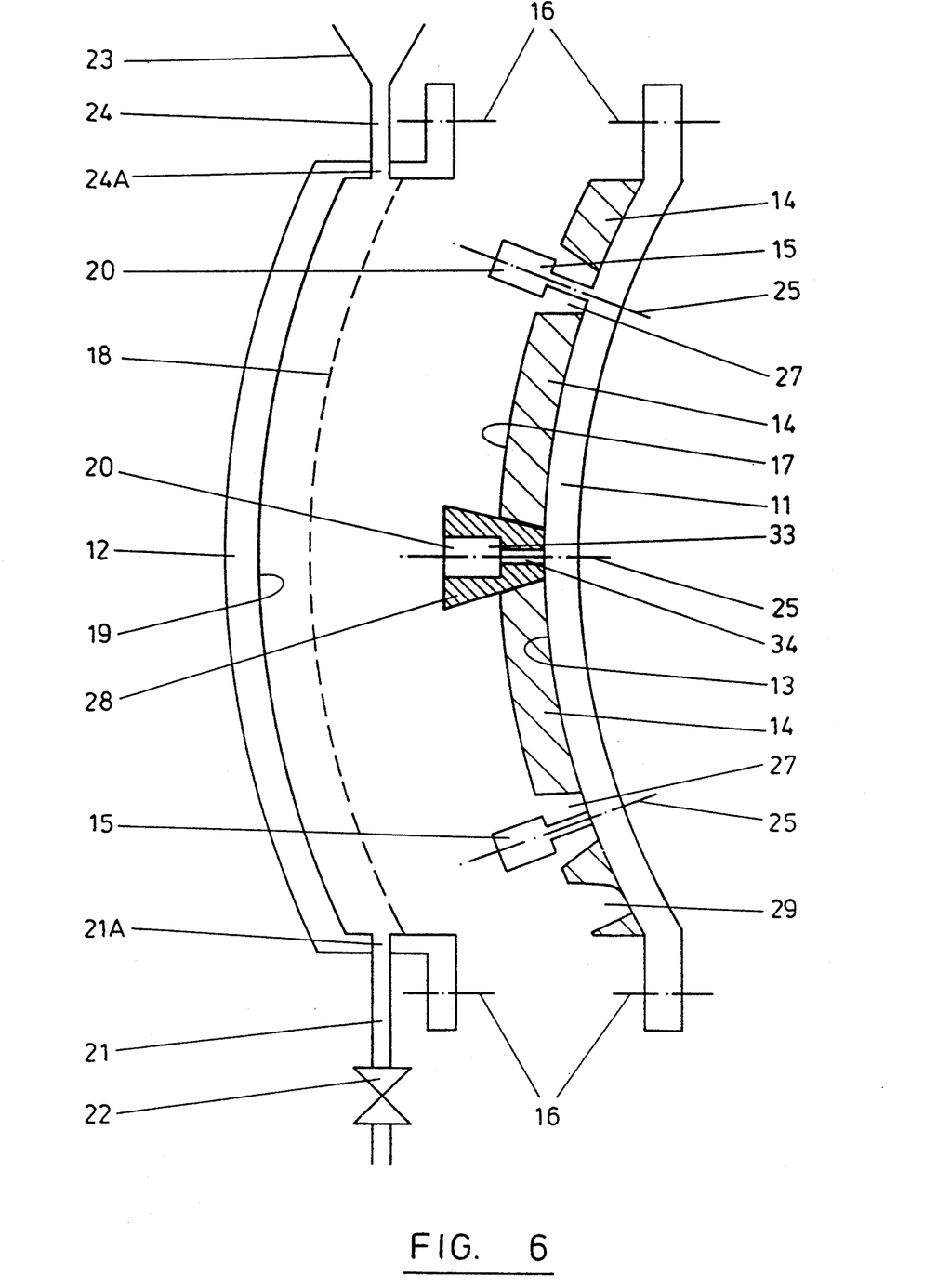
FIG. 6 shows a sectional elevation of male and female halves of a mould.

FIG. 6 shows male 11 and female 12 moulds for casting part tiling sections, e.g. for the pressure hull or saddle tank of a submarine. Surface 13 of male mould 11 corresponds to the curvature of the submarine to which the tiling will eventually be bonded. Fast with male mould 11 are annular formers 14 and frusto-conical formers 15. Though formers 15 may appear on FIG. 6 to be cylindrical, they are in fact slightly tapered to facilitate removal from tiling section 26 (FIG. 7) after casting. When the two halves 11, 12 of the mould are brought together and secured via bolts (indicated by centerlines 16), surface 17 of formers 14 will lie along line 18 and the ends 20 of frusto-conical formers 15 (and spacers 28) will abut surface 19 of mould 12. Before the mould is closed, surface 1g and that of the formers 14, 15 are coated with a non-stick material, so that the tiling mix will not adhere. If required a void 29 may be provided in annular former 14 for an edge piece(s) 30 to be included in the casting. The shape of voids 27, 29 must be carefully designed to avoid inclusion of air bubbles when the mould is filled.

An alternative to using frusto-conical formers 15 in mould 11,12 is to use pre cast spacers 28 which are fitted in voids 27 in formers 14. As these spacers 28 can be cast from the same mix as used to fill the mould (31, FIG. 7), a good bond 40 (FIG. 8) can be obtained.

The mould 11, 12 is now ready to be filled with liquid tiling mix, either by pumping in via valve 22 and pipe 21 or via funnel 23 and pipe 24. When the tiling has set, the mould 11, 12 may be opened. The first action is to remove the plugs of tiling in pipes 21 and/or 24. This can be done by unscrewing the pipes from mould 12 and drilling the rubber out of stub holes 21A, 24A, e.g. with a brace and bit. The two halves 11, 12 of the mould can then be separated; the tiling will remain attached to male section 11 by virtue of frusto-conical formers 15, which are removed via axial screws passing through mould 11, e.g. as indicated by centerlines 25. The pre-cast tiling section can then be removed from male mould 11 and preferably held by a vacuum pad strongback, as is known, before being offered up to the section of submarine where it is to be affixed. Variations of this procedure may also be adopted, e.g. using craneage, or frames moveable in relation to the submarine.

The frame or the like which is used to remove the pre-cast tiling section from the mould, or to move the pre-cast tiling section from a storage position and to facilitate the fixing of the tiling section onto the submarine hull advantageously has the following capabilities:

(i) the pre-cast tiling section is easily attached;

(ii) the tiling section, which may not be entirely rigid, is held securely in the required shape, for example parallel to the surface, is restrained against distortion due to its self-weight, irrespective of its attitude in space and is easily positioned and fitted in an accurate manner, without scuffing or distortion;

(iii) lifting, rotation and pre-setting of the tiling section into a correct attitude for approaching the surface prior to fitting is facilitated, preferably whilst suspended on a hydraulic hoist or crane;

(iv) the frame is light and easily manoeuvred (whether on its own or in a supporting structure) and is robust enough to be reliably usable in a construction environment—for example, the frame is capable of being turned with one edge in contact with the ground.

Figure 7:
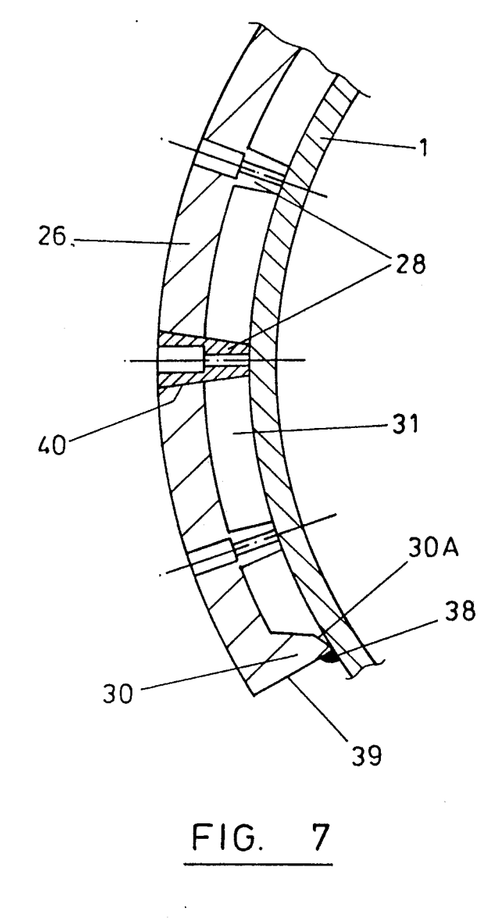
FIG. 7 shows a sectional elevation of a section of tiling, cast in the mould shown in FIG. 6.
Figure 8:
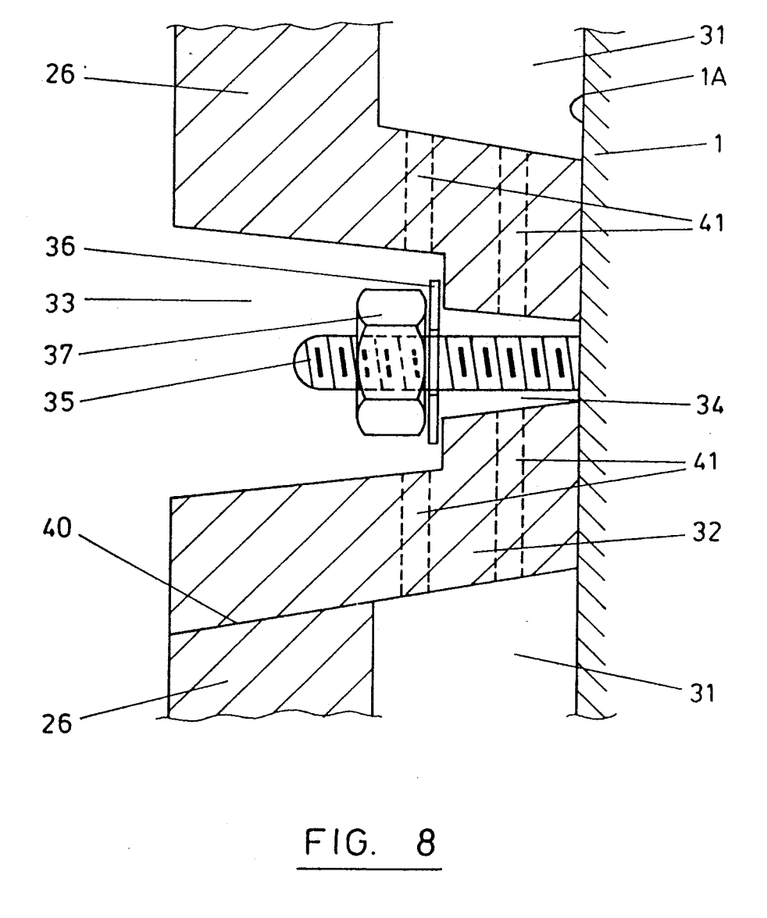
FIG. 8 shows, in sectional elevation, a detailed view of a spacer shown in FIG. 7, and its means of attachment to a surface.

FIG. 7 shows the tiling section 26 from mould 11, 12 in position against the submarine 1 with securable spacers 28 maintaining the design clearance, i.e. creating an annular space 31. A securable spacer 28 is shown in detail in FIG. 8. It basically consists of a truncated conical body 32, a frusto-conical void 33 and a frusto-conical clearance hole 34. Tiling section 26 is positioned accurately in relation to the other tiling sections already attached to submarine 1. When in position, lengths of stud iron (threaded bar) 35 are placed through clearance hole 34, using a holder (not shown), and attached to submarine 1 by capacitor discharge or drawn arc specialised stud welding equipment. Then a load-spreading washer 36 and nut 37 (or screwdriver slotted mushroom screw (not shown)) are fitted to secure (that part of) tiling section 26 to submarine 1.

FIG. 7 shows a tiling section 26 fully secured to submarine 1. Edge piece 30 abuts submarine 1 along a relatively narrow area left by an undercut 30A, to provide a seal which may be supplemented by a run of mastic 38 to ensure a liquid-tight join. Face 39 of edge piece 30 may be flat, as shown, or chamfered to permit subsequent sealing to the next tiling section 26 with mastic to give a smooth joint. Overlapped or scarfed joins between adjacent tiling sections 26 are also possible. A further possibility is to use a separate non-stick edge piece (not shown) in place of cast edge piece 30. When liquid mix 31 is set, the or each, non-stick edge piece is removed and the space(s) left filled when the void 31, created by fitting the next section 26, is filled with liquid mix.

Securable spacers 28 may be cast in situ in moulds 11, 12 or separately and placed in the mould 11, 12 (FIG. 6) prior to filling. Join 40 (FIG. 8) is intended to show this second option. Holes 33, 34 may be cast in edge pieces 30, if required, to enable edge pieces 30 to be held tightly to submarine 1 and thus ensure a liquid-tight joint.

When tiling section 26 is fully secured and all edges are sealed, the annular space 31 may be filled with tiling mix and allowed to solidify.

The method disclosed above is well suited to tiling consisting of two or more different layers of separate compositions. If a three layered tiling sandwich is required, the same method can be adopted by casting the outermost layer (i.e. furthest from submarine 1) using thick formers 14. When the tiling has set, mould 11, 12 is opened, thick formers 14 replaced by thinner ones 14A and the mould reassembled. The middle layer of mix is then run in and allowed to set. The mould 11, 12 is then opened for a second time and composite tiling section 26 fixed to submarine 1, as previously described, and the third batch of liquid mix run in to bond the section to submarine 1. Alternatively, the principle shown in FIG. 7 could be repeated with further cast sections 26 being attached to the outer surface of attached section 26.

Any elements 8 to be included in the tiling substrate can be fitted to the inner concave surface of tiling section 26, in the manner described previously with reference to FIG. 5, before attaching to hull 1. Alternatively, they can be attached to hull 1 before tiling section 26 is placed in position, or fixed in mould 11, 12 prior to filling with tiling mix.

Figure 9:
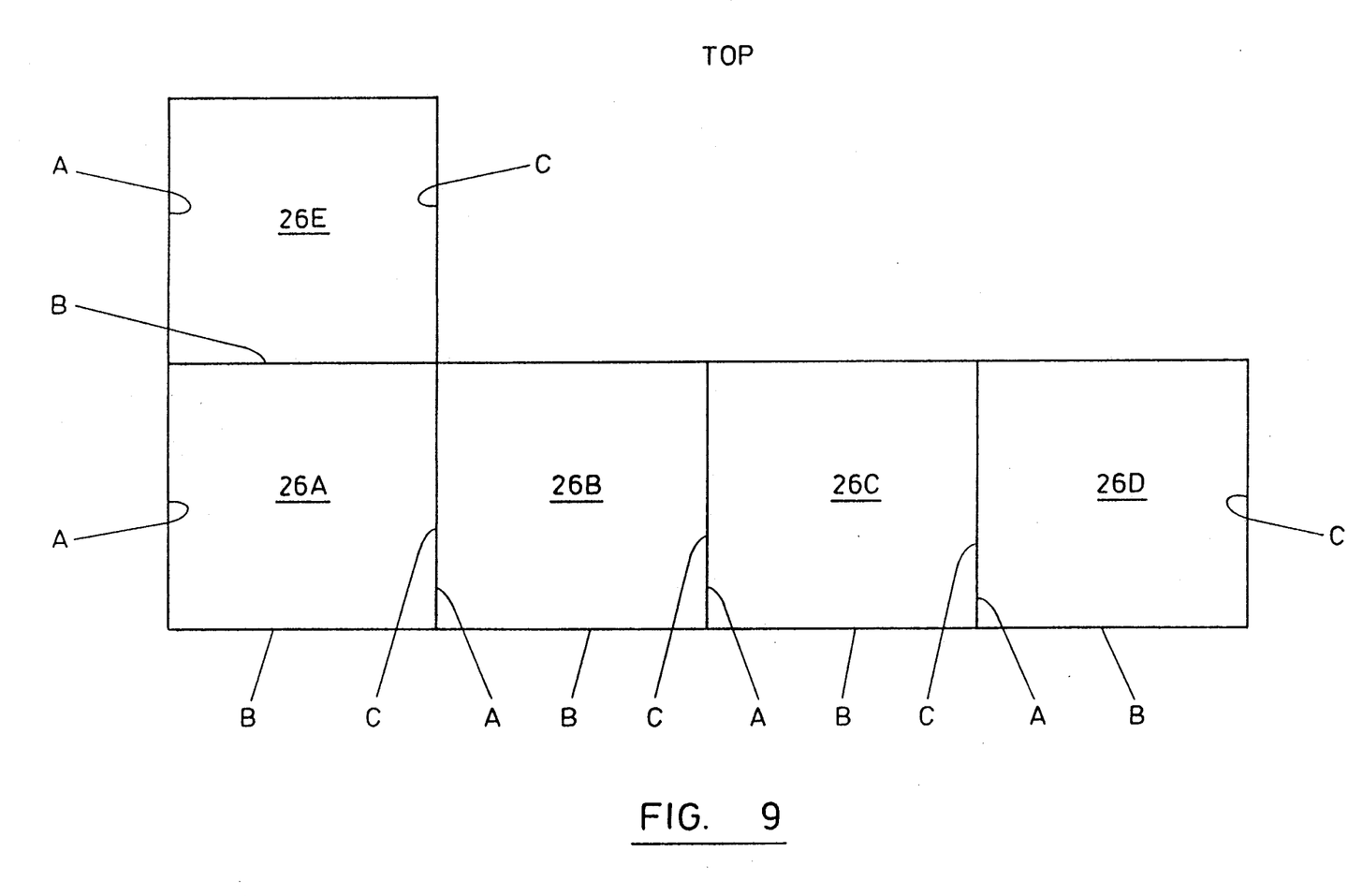
FIG. 9 shows diagrammatically the fixing of cast tiles onto a surface as the hull of a submarine or other vessel.

In one procedure, tiling sections 26 can be attached to submarine 1 as shown in FIG. 9, in which the word 'TOP' represents the upper part of the diagram.

Tiling section 26A is the first to be fitted with edge pieces 30 along sides A,, C and base B. The liquid mix is run in via the un-numbered top side. Tiling section 26B is then fitted, butting side 26B-A to side C of tiling section 26A. Edge pieces 30 are provided along base 26B-B and side 26B-C. The joint 26A-C to 26B-A can be sealed with mastic, e.g. a bead of mastic is placed along the edge of one of the mating sides and the two then brought together so that the mastic spreads and seals the joint. Alternatively, the sides 26A-C and 26B-A can merely be butted (or placed in close proximity) and a sticky sealing strip placed over the joint. Tilinq sections can be fitted and filled with liquid mix individually, e.g. 26A; then 26B; etc., or several sections, e.g. 26A to 26D fitted at the same time and subsequently filled together. When the lower row (26A-26D) has been completed, tiling section 26E can be fitted using the same principle as above.

In an alternative procedure, the tiling sections 26 are cast with open edges, that is without the edge pieces 30 shown in FIG. 7. The number of different mould variations required is thereby minimised. The exposed edges (26A-A; 26A-B, 26B-B, 26C-B, 26D-B, 26D-C and 26E-A) of the tiling sections 26 are then sealed with light scantling profiled dams made of wood, sheet metal, plastics or other suitable material which may be secured to the tiling sections by wood screws, adhesive tape or the like. In the example depicted in FIG. 9, the exposed edges (26E-A, 26A-A, 26A-B, 26B-B, 26D-B, 26D-C and 26H-C (not shown)) would be sealed by profiled dams and the joins between adjacent tiling sections 26 (for example 26A-C to 26B-A) would be sealed with, for example, adhesive tape.

Although the tiling sections 26 shown in FIG. 9 are apparently butted together, in a further alternative procedure it is possible to obtain an improved bond and a smoother external surface for the tiled submarine by spacing the tiling sections 26 at a given distance apart. Such a spacing distance may, for example, be substantially equal to the thickness of the tiling sections. Adhesive tape can be used to bridge the gap between adjacent tiling sections 26 which tape is desirably inherently strong or reinforced. Other materials can also be used for this purpose. A particular advantage of spacing the tiling sections 26 apart is that, after filling of the sections with the solidifiable liquid mix, when the liquid mix has solidified it is possible to remove the adhesive tape so that the solidified mix can be checked for integrity - i.e. the absence of air bubbles or possibly whole sections which have not been filled. Appropriate measures can then be taken to correct any defects.

Though square sections 26A-E have been shown in FIG. 9, any tesselating shaped tiles could be used. Also tiling 26 could be specially cast to fit awkward shapes, e.g. conical sections, or around apertures, e.g. pipe inlet/outlets.

When the liquid tiling mix has set, sealing strips, etc. are removed and the joins, e.g. 26B-C to 26C-A checked with any imperfection being sealed with mastic. The voids 33, 34 must also be filled with tile substance. This may be done in one of a number of basic ways, depending on their position on the submarine 1. In some cases, it is possible simply to cover the outer edge of frusto-conical void 33 with sticky tape and allow the liquid mix to flood in via passages 41, i.e. to fill them when void 31 is filled.

In other cases, where cylinder 33 faces upward, nut 37 can be released a few turns to release the pressure on washer 36 and liquid mix poured in, or pumped in under a sealing cover. In other cases, the voids 33, 34 could be filled via a mastic gun or with a trowel.

The size of the tiling section 26 will depend on the area to be covered and any peculiarities, e.g. fitments, valve inlet/outlets, etc. Generally, larger sections are preferred, but they present more severe handling problems and, if the sections are tall, sealing problems due to the hydrostatic pressure of the liquid mix. Hydrostatic pressure is an important factor in determining the spacing of spacers 28 as tiling section 26 must not be able to 'bulge' outwards between the spacers.

We claim:

1. A method of applying a segment of an acoustic covering layer to a surface of a marine vessel, which segment of the covering layer includes outer and inner layers, the method comprising the steps of:
   (i) providing a mold having a desired internal profile corresponding to a desired outer profile for said covering layer and filling the mold with a solidifiable liquid to cast an outer layer of the acoustic covering layer segment,
   (ii) removing said outer layer of the covering layer segment from the mold,
   (iii) positioning said outer layer of the covering layer segment in predetermined spaced relation to the vessel surface so as to create, between the vessel surface and an inner surface of said outer layer of the covering layer segment, a void which is substantially coextensive with the outer layer of the covering layer segment, and to give a correct outer profile and a thickness of the covering layer segment,
   (iv) providing a seal between the vessel surface and the outer layer of the covering layer segment on a base and sides thereof,
   (v) filling said void with a free flowing solidifiable liquid so as to form from said free flowing solidifiable liquid the inner layer of the covering layer segment, and allowing said solidifiable liquid to solidify and bond to both the outer layer of the covering layer segment and the surface to be covered.

2. A method according to claim 1, wherein the outer layer of the covering layer is positioned in said predetermined spaced relation to the surface by means of spacers.

3. A method according to claim 2, wherein the spacers are made separately from the outer layer of the covering layer segment and are fixed in position.

4. A method according to claim 2, wherein the spacers are cast as an integral part of the outer layer of the covering layer segment.

5. A method according to claim 1, wherein the step of sealing the outer layer of the covering layer segment to the surface to be covered is performed by casting edge pieces on the outer layer of the covering layer segment and sealing the edge pieces to the surface.

6. A method according to claim 1, wherein the step of sealing the outer layer of the covering layer segment to the surface to be covered is obtained by means of suitably shaped materials temporarily attached to the outer layer of the covering layer segment.

7. A method according to claim 1, wherein the mold has an inner profile which substantially matches the profile required for an outer surface of the covering layer.

8. A method according to claim 1, wherein elements are located within the substance of the covering layer.

9. A method of applying a covering layer comprising a plurality of acoustic covering layer segments to a surface of a marine vessel, which layer includes outer and inner layers, the method comprising the steps of:
(i) providing a plurality of molds having desired internal profiles corresponding to desired outer profiles for said covering layer and filling the molds with a solidifiable liquid to cast in each mold an outer layer of an acoustic covering layer segment,
(ii) removing said outer layers of the covering layer segments from the molds,
(iii) positioning said outer layers of the covering layer segments in predetermined spaced relating to the vessel surface and in confronting relation to adjacent outer layers of the covering layer segments so as to create, between the vessel surface and an inner surface of each of the outer layers of the covering layer segments, a void which is substantially coextensive with the outer layer of the covering layer segments, and to give a correct outer profile and thickness of the covering layer,
(iv) providing seals and sealing exposed side and base edges of the outer layers of the covering layer segments and joints between confronting layer segments,
(v) filling the void with a free flowing solidifiable liquid so as to form from said free flowing solidifiable liquid the inner layer of the covering layer, and allowing said solidifiable liquid to solidify and bond to both the outer layer of the covering layer segment and the surface to be covered.

* * * * *